Sept. 3, 1935.    McCONNELL SHANK ET AL    2,013,320
METHOD AND APPARATUS FOR MAKING CONTAINER CAPS
Filed Oct. 24, 1933    2 Sheets-Sheet 1
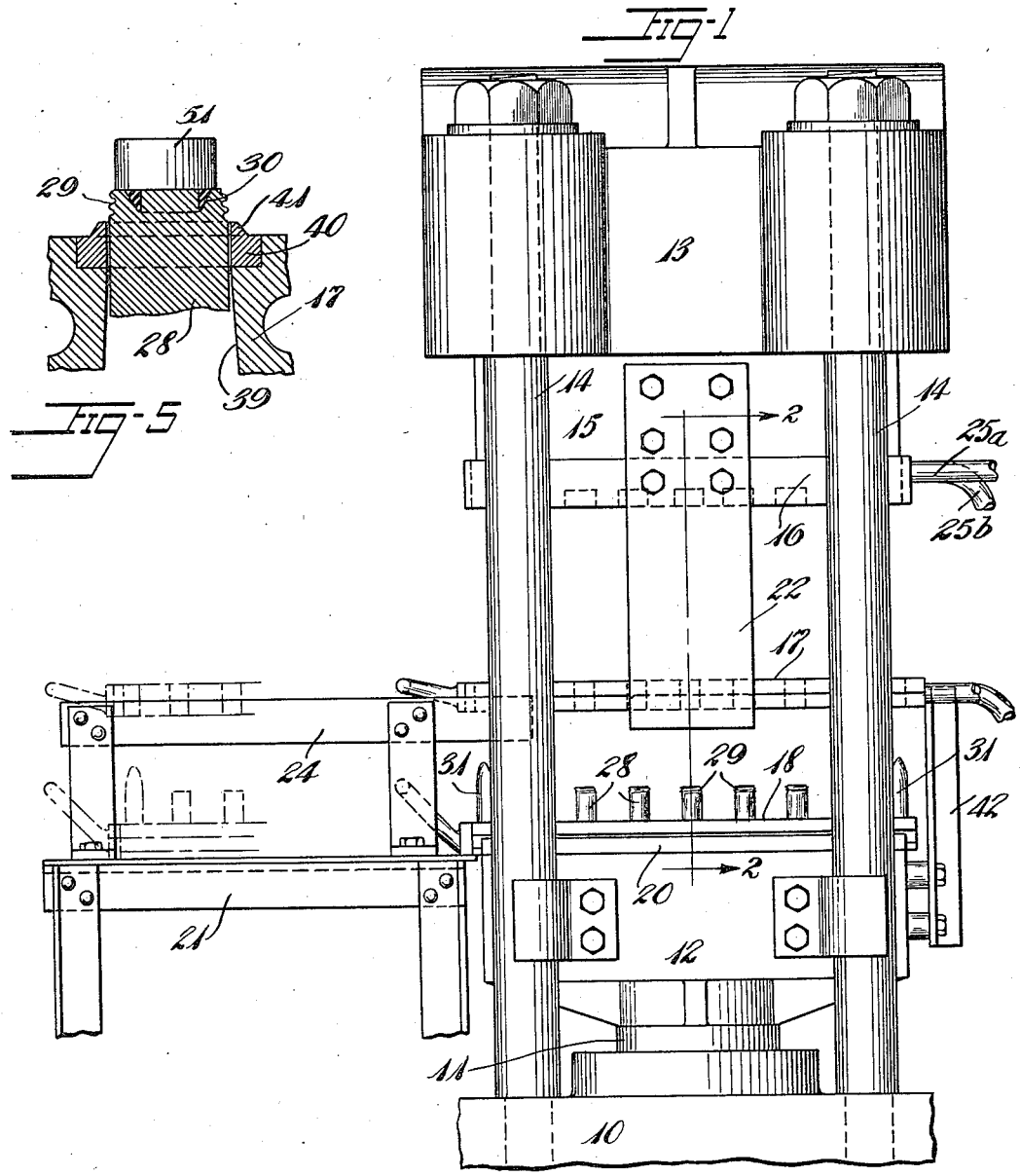
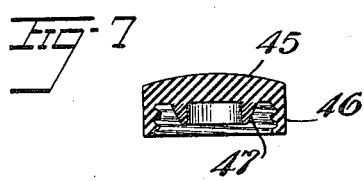
Inventors
McConnell Shank
Henry J. Flikkie
By Eakin & Avery
Attys.

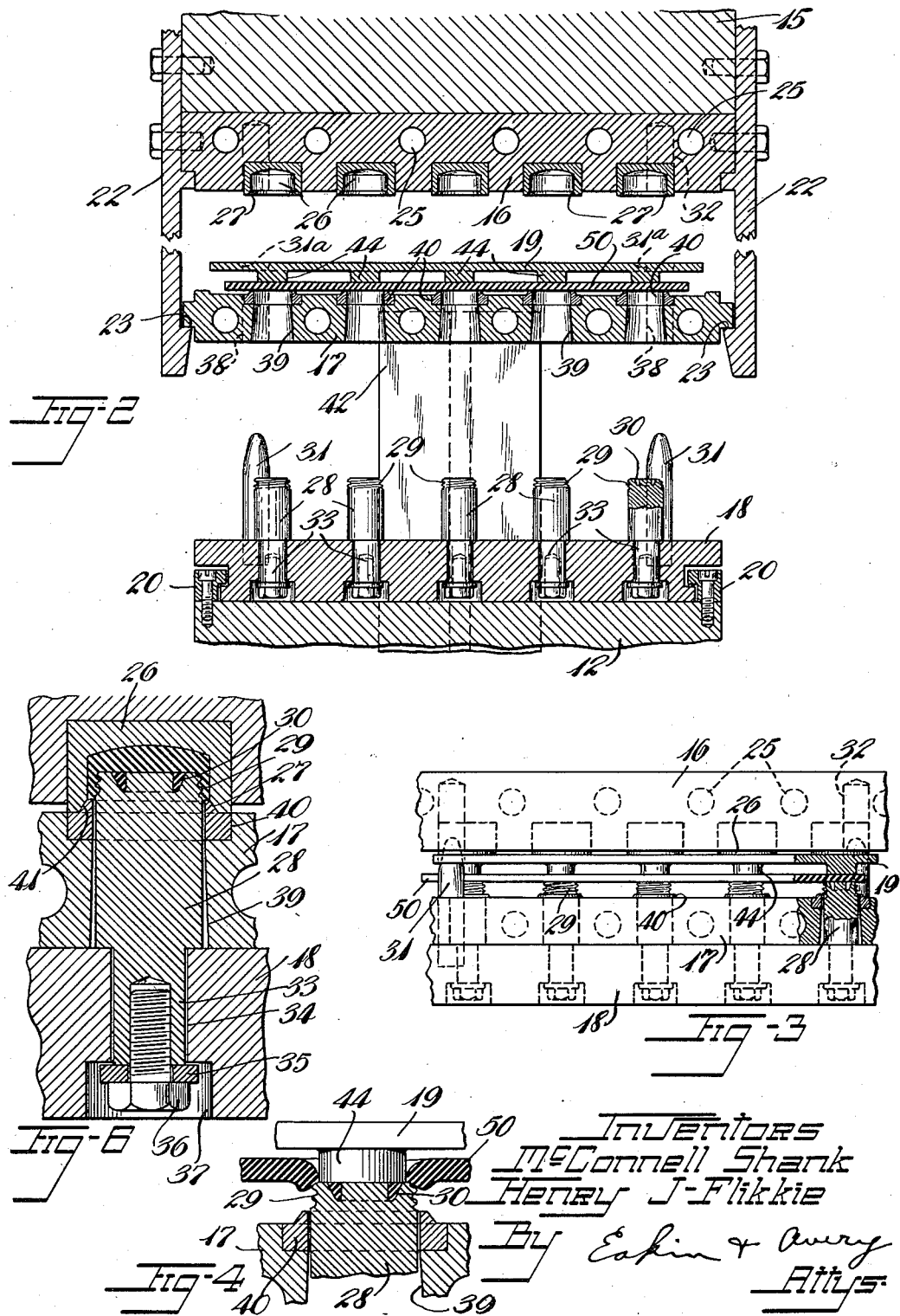

Patented Sept. 3, 1935

2,013,320

UNITED STATES PATENT OFFICE 2,013,320

METHOD AND APPARATUS FOR MAKING CONTAINER CAPS

McConnell Shank and Henry J. Flikkie, Akron, Ohio, assignors to The B. F. Goodrich Company, New York, N. Y., a corporation of New York Application October 24, 1933, Serial No. 694,948

6 Claims. (Cl. 18—16)

This invention relates to methods and apparatus for making container caps, and is especially useful in the production of caps having a rigid crown and a resilient integral seal molded from plastic materials and suitable for use on bottles and other containers.

In the molding of such caps formed of rubber or other plastic compositions great difficulty has been experienced in properly locating the various compositions in the mold and in maintaining proper relation of the compositions to each other during the molding operation.

The principal objects of this invention are to provide a novel apparatus and method whereby these difficulties are overcome, to provide economy and efficiency of operation, and to improve the quality of the product.

Other objects will appear from the following description and the accompanying drawings.

Of the drawings:

Fig. 1 is a side elevation of a molding press embodying a preferred form of apparatus for carrying out the invention, the press being shown in open position with the mold parts in place and separated, and the removed position of the lower and intermediate mold parts being partially shown by dot and dash lines, parts being broken away.

Fig. 2 is a sectional view on line 2—2 of Fig. 1, showing only the mold parts and adjacent structures, a sheet of plastic material and an auxiliary punch plate being also shown in place on the intermediate mold member, other parts being broken away.

Fig. 3 is a front elevation, partly in section, showing the mold parts of Fig. 2 in partially closed position, the press parts being omitted and portions of the mold parts broken away.

Fig. 4 is a detail view showing, partly in section, a set of elements like those shown in section in Fig. 3, the parts being completely closed so as to sever a portion from the sheet of plastic material, parts being broken away.

Fig. 5 is a detail sectional view showing one of the mandrels, the intermediate mold plate, the sealing plastic in place, and the blank for the crown of the cap in position for closing the mold, other parts being broken away.

Fig. 6 is a detail sectional view of the three parts of the mold closed with the formed cap therein, only one cavity being shown, other parts being broken away.

Fig. 7 is a cross sectional view of the finished cap.

Referring to the drawings, the press used in molding the articles is of the ordinary type used in vulcanizing rubber articles. It comprises a base 10 formed with a hydraulic cylinder, the ram 11 of which carries a movable platen 12. Spaced above the base 10 is a fixed head 13, there being a plurality of tension rods 14 for holding the base and head in spaced relation. The rods 14 also guide the platen 12. A fixed platen 15 is carried by the head.

The mold used in the final forming of the cap comprises a top member 16, or cavity plate, which is permanently suspended from the fixed platen of the press, an intermediate member 17, or stripper plate, removable from the press, and a lower member 18, or core plate, which may also be removable. In the final molding operation these plates are assembled as shown in Fig. 6.

In the preliminary molding operation, during which the cores are loaded with plastic material for forming the sealing element of the cap, the mold members just mentioned are employed together with an auxiliary plate 19.

To facilitate the positioning and removal of the movable mold members, certain guides and stops are provided as follows: A pair of guide strips 20, of L-section, are fastened to opposite margins of the movable platen 12, and the adjacent margins of the mold member 18 are grooved to cooperate therewith so that the core plate may be moved laterally out of the press but will be retained by the movable platen against vertical removal. A platform 21 is provided adjacent the press at such an elevation as to be level with the movable platen at its lowered position and serves to receive the lower mold member when the member is out of the press.

A pair of plates 22 are secured to the fixed platen 15 of the press and are formed with shoulders 23 for supporting the intermediate mold member 17 at a distance below the mold member 16. A pair of rails 24 are supported by the table 21 at an elevation equal to the shoulders 23, whereby the intermediate mold member 17 may be guided in and out of the press, the mold sliding on the shoulders 23 and the rails 24.

The upper mold member 16 is chambered, as at 25 so that steam may be circulated therethrough from flexible conduits 25a, 25b. It is formed with a plurality of article forming cavities. In the preferred form each article cavity is formed in a separate cavity member 26 seated in the plate 16 so as to project slightly therefrom and having an internally beveled lip 27.

The core plate 18 is provided with a plurality of projecting cores 28 adapted to cooperate with the cavity members 26. Each core is threaded near its end, as at 29, to form the screw threads of the cap. The top of each core is formed with an annular recess 30 to mold the sealing element of the cap.

In order to provide accurate alignment of the mold members, the core plate 18 is provided with dowel pins 31 adapted to enter dowel holes 32 in the upper plate. The cores 28 have reduced shanks 33 which pass through slightly larger openings 34 in plate 18 and are retained in position by washers 35 and screws 36. The plate 18 is counterbored on its lower side to provide clearance cavities 37 for the nuts and washers. The arrangement is such that the cores have floating engagement or limited lateral movement with respect to the plate to assist in aligning them with the cavity members 26.

The intermediate plate is formed with dowel holes 38 to fit dowels 31. It is also formed with clearance openings 39 through which the cores 28 may pass. Each clearance openings is counterbored at the upper face of the plate to receive bushings or mold members 40, each of which projects slightly above the plate and is formed with an externally bevelled lip 41 which fits the bevelled lip 27 of a cavity member 26. The bushings 40 are made a sliding fit on the cores 28 and assist in aligning the cores.

In order to align the core plate and the stripper plate with the top mold member in the direction in which they are free to slide, a stop 42 is attached to the movable platen of the press and projects thereabove so that the movable plates are limited in their movement into the press.

The auxiliary plate 19 is used only when loading the other mold members with the plastic composition used to provide the resilient sealing element of the cap. It is formed with dowel openings 31a which engage over dowel pins 31. It is also formed on its lower face with a series of cylindrical projections 44 having flat faces. The projections correspond in number and arrangement with the cores 28 and their faces are of such size as to close the annular grooves 30 when the projections are in contact with the cores as shown in Fig. 4.

The finished cap, as illustrated in Fig. 7, comprises a rigid crown 45 having an integral rigid skirt 46 internally threaded to engage the container. The resilient sealing element 47 is an annular projection from the crown adapted to engage the lip of the container. It is integral with the crown and is preferably made of soft vulcanized rubber.

In practicing the method of the invention the intermediate mold member 17 is withdrawn from the press to the dot and dash position of Fig. 1 upon the rails 24. A sheet of plastic material 50 suitable for forming the sealing elements 47 is laid over the plate 17. The auxiliary plate 19 is placed thereon and the member 17 returned to the press. The press is then closed, the movable platen moving the core plate 18 until its dowels 31 align plates 17 and 19. The sheet 50 of plastic material becomes engaged between the cores 28 and the faces of the projections 44 as shown in Fig. 3. Thereupon the plastic material is forced into the annular cavities 30 and is pinched off thereabout as illustrated in Fig. 4. The press is then opened and mold members 17 and 19 removed from the press to rails 24. The remainder of sheet 50 and the auxiliary plate 19 are removed. Plate 18 is now loaded with blanks 51 of plastic material suitable for forming the rigid crown and skirt of the cap, such as hard rubber composition. Due to the tacky nature of the blanks and of the deposited material, the blanks 51 are retained in position by adhesion.

The mold member 17 is now returned to the press, as is also the mold member 18, if this has been removed to load the cores. The press is again closed, the mold parts assuming the relative positions illustrated in Fig. 6. The press is held in closed position until vulcanization or other chemical setting of the caps has occurred.

After vulcanization of the caps, the platen 12 is lowered. The caps are first withdrawn from the cavity plate because of their threaded engagement with the cores. On further movement the intermediate plate 17 engages the shoulders 23 which prevent its further movement whereas the core plate being attached to the platen 12, descends therewith, and the plate 17 acts to strip the caps from the cores. The caps, being warm, may be snapped over the threads on the cores without permanent set, and upon cooling become rigid.

We claim:

1. The method of making a molded container cap having a rigid crown and integral therewith a resilient sealing element which comprises cutting a blank from a sheet of plastic material suitable for forming the sealing element and simultaneously forcing it into a cavity in a core member to completely fill the same, then applying a blank of another plastic material to the core member, and forming the last named blank around the core member.

2. Apparatus for molding container caps, said apparatus comprising a core plate provided with cores projecting from one face thereof, a stripper plate formed with apertures through which said cores may project, means for filling cavities in the projecting cores with plastic material, means cooperating with said stripper plate for molding other plastic material about the projecting ends of said cores in contact with said first named material, and means for vulcanizing said materials.

3. Apparatus for molding container caps, said apparatus comprising a core plate provided with cores projecting from one face thereof, said cores having cavities in their projecting ends, means for filling said cavities with plastic material, means for molding other plastic material in contact with said first-named material about the ends of said cores, said molding means including a plate through which said cores project and adapted to strip the finished caps from said cores.

4. Apparatus for molding container caps, said apparatus comprising a core member having a recess in its end, means for forcing plastic material into said recess to fill the same, means for molding other plastic material about the end of said core to complete the cap, and means for stripping the finished cap from said core.

5. Apparatus for molding container caps, said apparatus comprising a core member having a recess in its end, means for forcing plastic material into said recess to fill the same, and a mold for forming other plastic material about the end of said core to complete the cap, said mold including a pair of mold plates one of which may be used to strip the finished article from the core member.

6. Apparatus for molding container caps which comprises a cavity plate adapted to form the crown of the caps, a stripper plate adapted to cooperate therewith to complete the cavities around a plurality of core members, a core supporting plate, and a plurality of cores having floating engagement with the core plate and adapted to extend through the stripper plate to form the interior of the caps.

McCONNELL SHANK.
HENRY J. FLIKKIE.